United States Patent [19]

Saiki et al.

[11] Patent Number: 4,988,553
[45] Date of Patent: Jan. 29, 1991

[54] MOUNTING STRUCTURE OF SWITCHING UNIT

[75] Inventors: Shinichi Saiki; Kiyoshi Koide, both of Aichi, Japan

[73] Assignee: Kabushiki Kaisha Tokai Rika Denki Seisakusho, Aichi, Japan

[21] Appl. No.: 327,783

[22] Filed: Mar. 23, 1989

[30] Foreign Application Priority Data

Mar. 31, 1988 [JP] Japan ............................. 63-43622[U]

[51] Int. Cl.$^5$ ................................................ B32B 3/06
[52] U.S. Cl. ...................................... 428/99; 200/293; 200/295
[58] Field of Search ................... 428/99, 100; 200/295, 200/293; 248/27.3, 27.1

[56] References Cited

U.S. PATENT DOCUMENTS 4,602,138  7/1986  Berutto et al. ................... 200/295 X Primary Examiner—Alexander S. Thomas

[57] ABSTRACT

A mounting structure of a switching unit according to the present invention is detachably held in a holding aperture of a switching unit-mounting member. The unit comprises an engaging opening formed at an inner surface of the holding aperture and an elastic holding-pawl one end of which is fixed to a side of a case of the unit. The pawl has an engaging portion at a middle portion thereof and a press portion at the other end thereof. The engaging portion confronts the inner surface of the holding aperture to detachably engage with the engaging opening while the unit is held in the holding aperture. The press portion is protruded to an outside of the holding aperture. The pawl has enough elasticity to bend towards the side of the case so that the engaging portion is disengaged from the engaging opening by pressing the press portion in a direction away from the inner surface of the holding aperture.

7 Claims, 2 Drawing Sheets

MOUNTING STRUCTURE OF SWITCHING UNIT

BACKGROUND OF THE INVENTION

The present invention generally relates to a mounting structure of a switching unit, and more specifically, to a structure for detachably mounting the switching unit in a switching unit-holding aperture by an elastic force of a holding pawl attached at the side of a case for the unit.

Conventionally, there have been known a various types of switching units, such as an elastic holding-pawl whose one end is fixed at the side of a case of a switching unit and presses the inner surface of a peripheral wall for forming a switch unit-holding aperture of a switch unit-mounting member such as a panel by an elastic force thereof, and the pawl has an engaging portion protruding in a direction away from the side of the case, so that the engaging portion is brought into engagement with an engaging opening formed at the inner face of the wall of the holding aperture to detachably hold the unit into the holding aperture of the panel.

According to the mounting structure, when the unit is removed from the holding aperture, the engaging portion thereof is completely removed from of the engaging opening against the elastic force of the pawl before the unit is pulled in a direction in which the unit is removed from of the holding aperture, and thus the unit can be disengaged from the holding aperture.

When the engaging portion is completely removed from the engaging opening against the elastic force of the pawl in the case where the engaging opening does not penetrate through the wall of the holding aperture, a screwdriver must be inserted into a very small gap between the surface of the pawl and the inner surface of the wall of the holding aperture in order to make the pawl bend in a direction in which the pawl is separated from the inner surface of the wall.

In such an operation, there have been problems whereby the contact between the screwdriver and the side of the case or the wall of the holding hole may cause the damage to the side of the case or the wall. Furthermore, in the case where plural pawls are attached at the side of the case, when the unit is removed from the holding aperture, such a very difficult operation is required wherein each engaging portion of the plural pawls is removed from each of the engaging openings by the screwdriver at the same time.

On the other hand, in the case where the engaging opening penetrates through the peripheral wall of the holding aperture, an appropriate jig is required to inserted into the engaging opening from the outside of the wall to enable the engaging portion, to be removed from the engaging opening in order to disengage the unit from the holding aperture. In this case, there has been a problem that a tool, i.e. the jig, is also required to carry out the operation. Furthermore, in the case where the plural pawls are attached at the side of the case, when the unit is removed from the holding aperture each engaging portion of each pawl is required to press out from each of the engaging opening at the same time. The operation is also very difficult to carry out. For resolving the problems, there has been proposed a special tool which is specially designed to press both the engaging portions from the outside of the wall of the holding aperture at the same time. However, there have been problems whereby a special tool corresponding to each kind of unit is required and such requirement is very uneconomical. The different pitch with respect to the arrangement of the engaging portions and the engaging depth of the engagement between the engaging portion and the engaging opening prevent the same, kind of the tool from adapting thereto, resulting in the requirement of a different tool corresponding to every unit.

SUMMARY OF THE INVENTION

Accordingly, an essential object of the present invention is to remedy the above-described disadvantages and to provide a mounting structure of a switching unit in which the unit can be easily removed from a switching unit-holding aperture of a switching unit mounting member without requiring any tool such as the screwdriver, the jig, or the special tool.

In accomplishing this and other objects, there is provided a mounting structure of a switching unit which is detachably held into a holding aperture of a switching unit-mounting member, comprising; an engaging opening formed at an inner surface of the holding aperture and an elastic holding-pawl, one end of which is fixed to a side of a case of the unit and which has an engaging portion at a middle portion thereof and a press portion at the other end thereof; the engaging portion, confronting the inner surface of the holding aperture to detachably engage with the engaging recess while the unit is held in the holding aperture, the press portion protruding to an outside of the holding aperture, and the pawl having elastic enough to bend towards the side of the case so that the engaging portion is disengaged from the engaging opening by pressing the press portion in a direction away from the inner surface of the holding aperture.

In another aspect of the present invention, the case has a pair of side members arranged generally parallel to each other and the holding-pawl is formed at each of the pair of side members.

In a further aspect of the present invention, a gap is formed between the pawl and the side of the case and the gap is larger than the engaging depth of the engaging portion into the engaging opening.

By the above construction of the present invention, the engaging portion of the pawl is engaged into the engaging opening and thus the unit can be held, within the holding aperture. In this state, an operation for removing the unit from the holding aperture will occur as follows: the press portion of the pawl is pressed towards the case to make the pawl bend towards the case against the elastic force of the pawl, so that the engaging portion of the pawl is removed from the engaging opening. Then, the unit is pulled in a direction in which the unit is removed from of the holding aperture. Since nothing prevents the unit from being removed from the aperture, the unit can be easily disengaged from the aperture.

In the case where the pair of sides of the case are arranged generally parallel to each other and the pawl is attached to each side thereof, both the press portions are pressed by two fingers, for example, a thumb and a forefinger of an operator, so that each engaging portion can be removed from each engaging opening at the same time. Then, in this state, the unit is pulled in the direction in which the unit removed from of the holding aperture and thus the unit can be, disengaged from the holding aperture.

Therefore, according to the construction of the present invention, without requirement of any tool such as screwdriver and jig, the unit can be easily removed from the holding aperture.

BRIEF DESCRIPTION OF THE DRAWINGS

These and other objects and features of the present invention will become apparent from the following description taken in conjunction with the preferred embodiment thereof with reference to the accompanying drawings, in which.

DETAILED DESCRIPTION OF THE INVENTION

Figure 1:
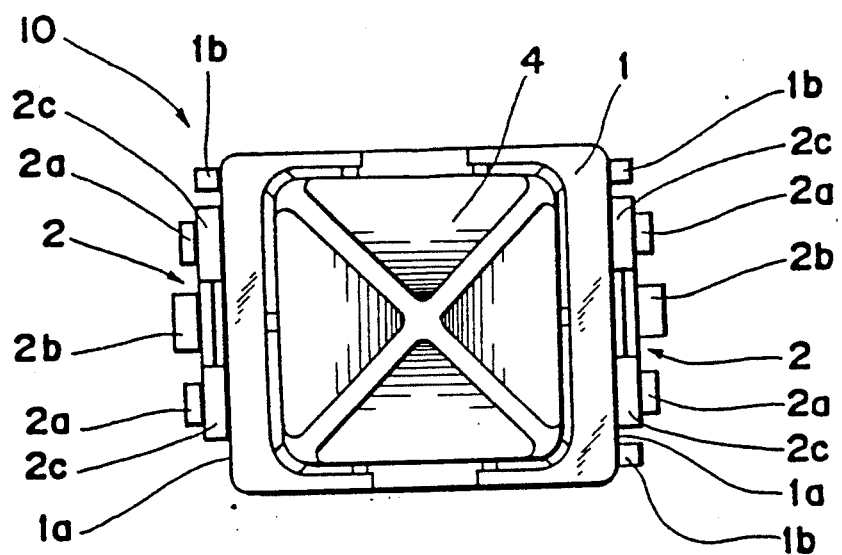
FIG. 1 is a top plan view showing a mounting structure of a switching unit according to a preferred embodiment of the present invention.

Before the description of the present invention proceeds, it is to be noted that like parts are designated by like reference numerals and symbols throughout the accompanying drawings.

Figure 2:
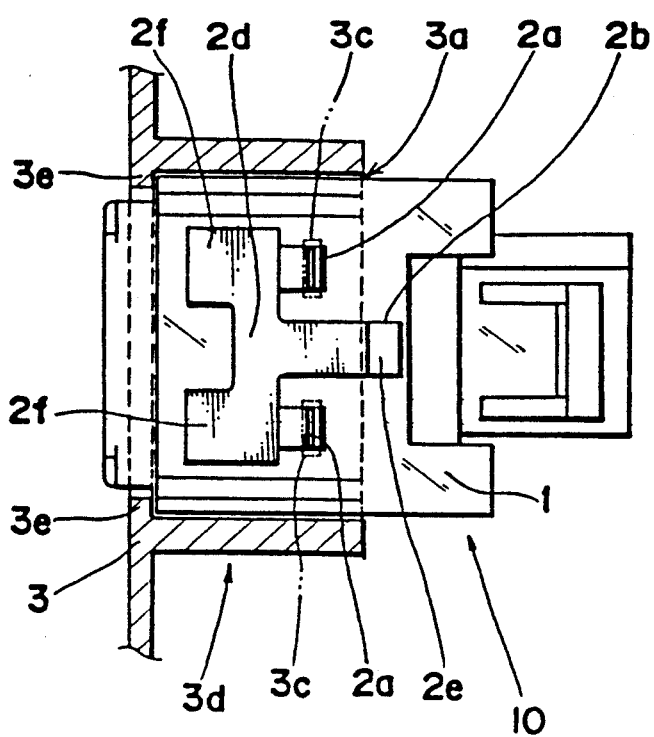
FIGS. 2 and 3 are partially sectional side views showing a state where the unit shown, in FIG. 1 is held into a switching unit-holding aperture of a panel.
Figure 3:
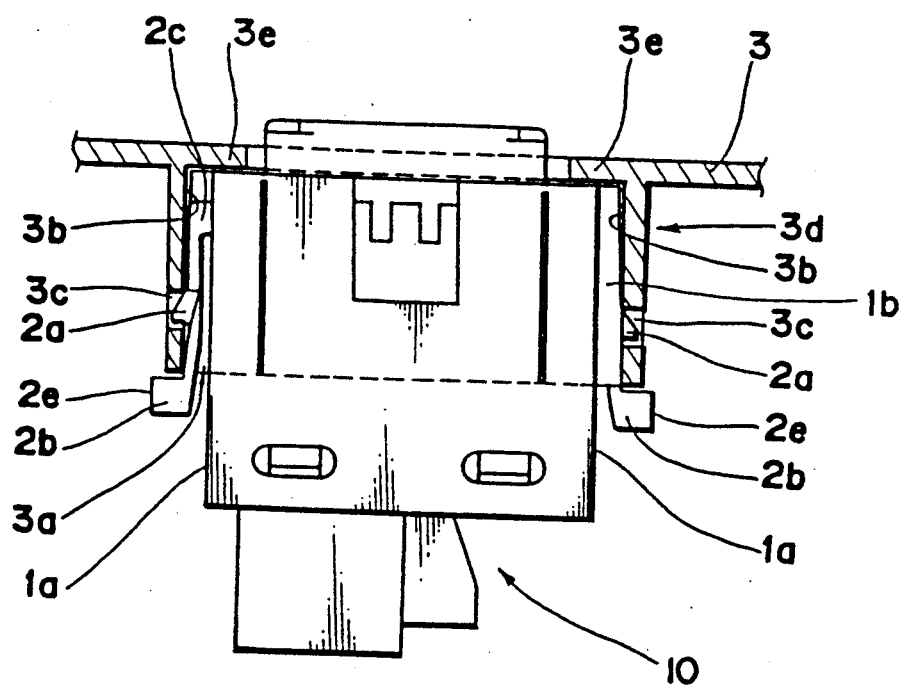

FIGS. 1-3 show a mounting structure of a switching unit 10 of one preferred embodiment according to the present invention. The unit 10 has a switch 4 for adjusting an inclination of a mirror body of an outer mirror of a motor vehicle in upward, downward, rightward and leftward directions by manual operation in a cabin. The unit, 10 is detachably held into a switching unit-holding aperture 3a of a panel 3 as a switching unit mounting-member.

The unit 10 is accommodated into a case 1, of the unit 10, having a rectangular configuration. The switch 4 also having a rectangular configuration protrudes from the front surface of the case 1 to tilt in upward, downward, rightward, and leftward directions for adjustment of the mirror body angle of the outer mirror. Each holding pawl 2 made of synthetic resin is attached to each of the sides 1a and 1a of the case 1 which are arranged generally parallel to each other. The pawls 2 and 2 are located at opposite sides of the case with respect to each other.

As shown in FIGS. 2 and 3, the pawl 2 has a pair of holding pawl bodies 2f and 2f and a T-like member 2d integrally connected to the bodies 2f and 2f. Each of the holding pawl bodies 2f and 2f includes a fixed end 2c fixed to the side 1a of the case 1 at one end thereof and a free end comprising an engaging portion 2a at the other end thereof. The holding pawl bodies 2f and 2f are integrally connected with each other through one end of the T-like member 2d.

Each of the engaging portions 2a and 2a is formed to protrude towards the inner surface of the holding aperture 3a from each holding pawl body 2f, so that the engaging portions 2a confront the inner, surface of the holding aperture 3a while the unit 10 is held within the holding aperture 3a.

A press portion 2b is formed at the other end, i.e. free end, of the T-like member 2d. The press portion 2b is formed to protrude sufficiently to the outside of a peripheral wall 3d of the panel 3 in a state where the switching unit 10 is held into the holding aperture 3a. The end of the press portion 2b is formed to be bent in a direction intersecting generally perpendicularly to the longitudinal direction of the T-like member 2d. Then, a finger contact face 2e is formed at the outer face of the end of the press portion 2b in generally parallel to each side 1a of the case 1 and has an area large enough to be pressed by a finger.

A protruding portion 1b for guiding engagement of the unit 10 into the holding aperture 3a which has a the length generally equal to the depth of the holding aperture 3a is formed to protrude in the longitudinal direction of the case 1 in the vicinity of each end of one side 1a of the case 1 in two rows parallel to each other. On the other hand, a row of the protruding portion 1b protruding in the longitudinal direction of the case 1 is formed in the vicinity of the one end of the other side 1a of the case 1.

The switching unit-holding aperture 3a of the panel 3 is formed by the peripheral wall 3d having a generally rectangular shape and protruding rearwardly from the back of the panel 3. Two engaging recess openings or 3c and 3c penetrating through the wall 3d are formed at the wall 3d to confront each other, so that the two engaging portions 2a and 2a of each holding pawl 2 detachably engage with the engaging openings 3c and 3c, respectively.

In the above-described mounting structure of the switching unit, the switching unit 10 is mounted to the panel 3 as follows: the unit 10 is inserted into the holding hole 3a while each pawl 2 is bent towards the case 1, so that the two engaging portions 2a and 2a of each holding pawl 2 engage into the engaging openings 3c and 3c of the wall 3d, respectively, to detachably hold the unit 10 in the holding aperture 3a. In the case where the unit 10 is engaged in the holding aperture 3a, the front surface of the unit 10 is engaged with an engaging edge 3e formed at the front end of the panel 3 which is positioned in the holding aperture 3a. In this state, the engaging depth of each engaging portion 2a into each engaging opening 3c is approximately equal to or less than the distance of a gap between the holding pawl body 2f and the side 1a of the case 1, so that when the pawl 2 is bent towards the case 1, each engaging portion 2a is designed to be removed from the engaging opening 3c.

The unit 10 is disengaged from the holding aperture 3a as follows: each finger contact surface 2e of each press portion 2b of the holding pawl 2 is contacted with a finger so that both the holding pawls 2 and 2 are pressed nearer to each other by the fingers. Thus, each contact portion 2b is moved towards the side 1a of the case 1 into the gap to make each pawl 2 bend. Then, each engaging portion 2a of each pawl 2 is removed from each engaging opening 3c to disengage each engaging portion 2a from each engaging opening 3c. In this state, the unit 10 is pulled out of the, panel 3 in a direction in which the unit 10 is removed from the holding aperture 3a, so that the unit 10 can be completely taken out of the holding aperture 3a and disengaged therefrom.

As described above, according to the mounting structure of the unit of the embodiment, the unit 10 can be very easily removed from the holding aperture 3a while each engaging portion 2a of the pawl 2 is disengaged from each engaging opening 3c at the same time without any tools.

The present invention is not limited to the embodiment described above; it can be put into practice in other various forms; for example, although the two holding pawls 2 and 2 are formed at each side 1a of the case 1, only one holding pawl 2 may be formed at each side 1a thereof or plural pawls 2 may be formed at each side 1a thereof. The material of the pawl 2 is not limited to synthetic resin: the pawl 2 can be elastic in material or construction. Although each pawl 2 has the two engaging portions 2a and 2a, each pawl 2 can have one, three or more portions 2a. Since the panel 3 is thin in the embodiment, the peripheral wall 3d is protruded from the rear of the panel 3 to form the holding aperture 3a for holding the unit 10. If the panel 3 is thick enough to form the switching unit-holding aperture 3a, the wall 3d is not required. Though the other end of the pawl 2 is not fixed to the side of the case 1 to form the free end, it can be fixed thereto as long as such a construction does not prevent the engaging portions 2a from bending as described above.

Although the present invention has been fully described by way of example with reference to the accompanying drawings, it is to be noted here that various changes and modifications will be apparent to those skilled in the art. Therefore, unless otherwise such changes and modifications depart from the scope of the present invention, they should be construed as being included therein.

What is claimed is:

1. A mounting structure of a switching unit which is detachably held into a holding aperture of a switching unit-mounting member, comprising:

an engaging opening formed at an inner surface of the holding aperture; and an elastic holding-pawl, a front end of which is fixed to a side of a case of the unit, said holding-pawl having an engaging portion at a middle portion thereof and a press portion at a back end thereof;

the engaging portion confronting the inner surface of the holding aperture to detachably engage with said engaging opening upon inserting the unit into the holding aperture, the press portion being protruded to an outside of the holding aperture in a backward direction with respect to the unit, said pawl having enough inherent elasticity to enable the engaging portion to be disengaged rom said engaging opening by pressing the press portion in a direction away from the inner surface of the holding aperture;

wherein said pawl has a pair of holding-pawl bodies and a T-shaped member of which both sides of a front portion are integrally connected with the bodies; wherein each body has a front end fixed to the side of the case, and a back end; the back end of one of the bodies has the engaging portion and the back end of the other of the bodies has another engaging portion capable of engaging into another engaging opening formed at the inner surface of the holding aperture in a backward direction with respect to the unit; and the press portion is formed at a back end of the T-shaped member; whereby, both of the engaging portions are capable of being removed from the engaging openings by pressing the press portion.

2. A mounting structure of a switching unit as claimed in claim 1, wherein the case has a pair of side members arranged generally parallel to each other and said holding-pawl is formed at each of the side members of the case.

3. A mounting of structure of a switching unit as claimed in claim 1, wherein a gap is formed between the pawl and the side of the case and the gap is larger than the engaging depth of the engaging portion into the engaging opening.

4. A mounting structure of a switching unit as claimed in claim 1, wherein said engaging opening is formed at a wall protruding from the switching unit-mounting member.

5. A mounting structure for detachably receiving a switching unit comprising:

a front panel member having a planar front face and at least one opening formed in said planar front face for receiving an actuable portion of said switching unit;

wall members integrally formed with an extending rearwardly with respect to the planar front face of said panel member, said wall members forming an aperture for receiving said switching unit in alignment with said at least one opening;

at least one elastic holding pawl member connected at a first end thereof to said switching unit and having a second end biased away from and movable in a direction transverse to said switching unit;

at least one engaging portion formed in connection with said at least one elastic holding pawl and being movable in synchronism with the second end of said pawl member;

means, formed within at least one of said wall members, for receiving said at least one engaging portion; and means, extending below said wall members, for biasing said second end toward said switching unit, thereby disengaging said at least one engaging portion from said means for receiving, whereby said switching unit is freely removable from said front panel opening.

6. The mounting structure according to claim 5, wherein said means for receiving is at least one opening formed in said wall members at a position directly corresponding to said engaging portion.

7. The mounting structure according to claim 5, wherein said means for biasing include a pressing member at the distal second end of said elastic holding pawl member, whereby pressure against the biasing force of said second end simultaneously disengages said at least one engaging portion.

* * * * *